UNITED STATES PATENT OFFICE.

WILLIAM F. DOERFLINGER, OF NIAGARA FALLS, NEW YORK.

MIXED PAINT AND METHOD OF MAKING SAME.

No. 884,475.            Specification of Letters Patent.            Patented April 14, 1908.

Application filed September 14, 1906. Serial No. 334,677.

*To all whom it may concern:*

Be it known that I, WILLIAM F. DOERFLINGER, a citizen of the United States, residing at Niagara Falls, in the county of Niagara and State of New York, have invented a new and useful Improvement in Mixed Paints and Methods of Making Same, of which the following is a specification.

The ready mixed bronze or gold paints heretofore known have suffered from various defects which have greatly restricted their field of usefulness. Some of these paints when stored in metallic cans spoil in a short time, either by coagulating to a jelly-like mass, or by turning green, or by the bronze powder settling in a lumpy mass on the bottom of the can or other vessel in such a way that it cannot again be satisfactorily mixed with the liquid ingredients of the paint. Others of these paints are of such thin viscosity as to float the pigments very imperfectly, require a disproportionately large amount of bronze powder, and produce thin coats of poor appearance and little durability. Others of these paints produce coats which are either dull and unattractive when new or soon lose their luster.

The object of this invention is to produce a ready mixed bronze or gold paint which is free from these defects and which produces a lasting coat of fine appearance.

In practicing this invention I employ a solution of an organic acid ester in a volatile solvent which does not injuriously react with the bronze powder; such ester being a colloid ester which is solid at ordinary temperature and forms a cohesive film upon the evaporation of the solvent. I prefer to employ the organic acid esters of cellulose, for instance, cellulose acetate or cellulose butyrate, but other colloid organic acid esters may be employed, for instance, acetate of starch.

The solvent is selected with reference to the particular ester which is employed and also with reference to the bronze or other powder and the material of the cans or other receptacles for the paint. The solvent should be such as not to react with the bronze or other powder or the tin of the cans or receptacles.

If neutral materials are employed the ester is simply dissolved in the solvent and the bronze powder is mixed with the solution. Ordinary commercial materials usually contain a trace of acid and when such materials are employed a suitable neutralizing agent is added which does not injuriously react with the other ingredients. The neutralizing agent is preferably employed in excess to insure a complete neutralization and the excess is allowed to settle or is removed in some other suitable way.

As an example of the practice of my invention, 6 ounces of cellulose acetate are dissolved in one gallon of acetone, and 8 ounces of anhydrous sodium carbonate are added. The solution is well stirred, allowed to settle, the clear solution is decanted off, and 1.5 pounds of metallic gold bronze powder are mixed therewith. The bronze powder is usually an alloy of copper with one or several lighter metals, for instance, zinc, tin or aluminium. Other substances may be added to the above mentioned ingredients, as the particular purpose for which the paint is designed may render desirable. Such additional substances should be of such nature or should be so treated that they do not react injuriously with the bronze or other powder or the tin cans or other receptacles. Gum resins and oils, particularly castor oil, may be so employed.

The mixed paint keeps well in tin cans and other vessels, does not react with the bronze powder or the tin of the cans, works well under the brush, and produces a durable and brilliant coat which preserves its luster for a long time.

I claim as my invention:

1. A ready mixed paint comprising a solution of cellulose acetate in a volatile solvent and a pigment containing metallic gold bronze powder, substantially as set forth.

2. A ready mixed paint comprising a pigment containing bronze powder, and a solution of organic acid colloid ester in a volatile solvent which does not react with the bronze powder, substantially as set forth.

3. A ready mixed paint comprising a pigment containing metallic gold bronze powder, and a solution of cellulose acetate in acetone, substantially as set forth.

4. The method of preparing a ready mixed paint which consists in preparing a neutral solution, in a volatile solvent, of an organic acid ester which is solid at ordinary temperature and forms a cohesive film upon the evaporation of the solvent, and mixing with the solution a pigment containing bronze powder, substantially as set forth.

5. The method of preparing a ready mixed paint which consists in preparing a solution, in a volatile solvent, of an organic acid ester which is solid at ordinary temperature and forms a cohesive film upon the evaporation of the solvent, neutralizing the solution, and mixing therewith a pigment containing bronze powder, substantially as set forth.

6. A ready mixed paint comprising metallic gold bronze powder and a solution of an organic acid ester of cellulose which does not react with the same, substantially as set forth.

Witness my hand in the presence of two witnesses.

WILLIAM F. DOERFLINGER.

Witnesses:
LILIAN M. DOERFLINGER,
CAROLINE DOERFLINGER.